United States Patent [19]

Miller et al.

[11] Patent Number: 4,883,200
[45] Date of Patent: * Nov. 28, 1989

[54] THERMOPLASTIC MELTING APPARATUS WITH A LEVEL INDICATOR

[75] Inventors: Scott R. Miller, Roswell, Ga.; Robert A. Dunn, Westlake, Ohio

[73] Assignee: Nordson Corporation, Westlake, Ohio

[ * ] Notice: The portion of the term of this patent subsequent to Feb. 7, 2006 has been disclaimed.

[21] Appl. No.: 249,545

[22] Filed: Sep. 28, 1988

Related U.S. Application Data

[63] Continuation-in-part of Ser. No. 114,437, Oct. 29, 1987, Pat. No. 4,821,922.

[51] Int. Cl.$^4$ ............................................. G01G 13/00
[52] U.S. Cl. ........................................ 222/77; 222/56; 222/146.5; 177/45; 177/210 R
[58] Field of Search .................... 222/43, 44, 50, 55, 222/56, 58, 64, 77, 146.2, 146.4, 146.5; 177/45, 184, 225, 230, 231, 210 R; 417/37, 362; 220/256, 259; 209/595

[56] References Cited

U.S. PATENT DOCUMENTS

| | | | |
|---|---|---|---|
| 1,178,553 | 4/1916 | Tannewitz | 220/259 |
| 1,738,634 | 12/1929 | Bryant | 209/595 |
| 1,994,550 | 3/1935 | Watson | 209/595 |
| 3,216,517 | 11/1965 | John | 177/210 R |
| 3,377,466 | 4/1968 | Paulsen . | |
| 3,545,556 | 12/1970 | Tramposch | 177/45 |
| 3,566,984 | 3/1971 | Weickhardt | 177/225 |
| 3,792,801 | 2/1974 | Baker et al. . | |
| 3,815,788 | 6/1974 | Reighard et al. . | |
| 3,827,603 | 8/1974 | Reighard et al. . | |
| 3,876,105 | 4/1975 | Kelling . | |
| 3,964,645 | 6/1976 | Scholl . | |
| 3,981,416 | 9/1976 | Scholl . | |
| 4,073,409 | 2/1978 | Gardner et al. . | |
| 4,227,069 | 10/1980 | Gardner et al. . | |
| 4,447,707 | 5/1984 | Baker . | |
| 4,455,474 | 6/1984 | Jameson et al. . | |
| 4,456,151 | 6/1984 | Lewellen | 222/146.5 |
| 4,474,311 | 10/1984 | Petrecca . | |
| 4,485,941 | 12/1984 | Frates et al. . | |
| 4,485,942 | 12/1984 | Petrecca . | |
| 4,667,850 | 5/1987 | Scholl et al. | 222/146.5 |

FOREIGN PATENT DOCUMENTS

| | | |
|---|---|---|
| 1584323 | 10/1969 | Fed. Rep. of Germany . |
| 1800864 | 6/1970 | Fed. Rep. of Germany ...... 177/225 |
| 581317 | 10/1976 | Switzerland ........................ 222/58 |

OTHER PUBLICATIONS

"Cantilever Beam Load Cell", Model: CBU, from *Revere* brochure.

*Primary Examiner*—Joseph J. Rolla
*Assistant Examiner*—Steven M. Reiss
*Attorney, Agent, or Firm*—Wood, Herron & Evans

[57] ABSTRACT

A thermoplastic melting apparatus comprises a tank pivotally mounted upon bearings within the interior of a housing having a top cover. An electrical or mechanical level indicator device is mounted exteriorly of the tank which is effective to sense pivotal movement of the tank as it is loaded with and/or emptied of thermoplastic material, and to produce a signal which indicates the quantity of thermoplastic material within the tank. The level indicator device is isolated from dynamic forces produced by drive linkages which operate pumps associated with the tank, by positioning the pivot axis of the bearings in the same plane as the force produced by the drive linkage. The lid of the tank is isolated from downward forces applied to the top cover of the housing to prevent the transmittal of forces to the level indicator devices from objects placed on the top cover of the housing or the like.

13 Claims, 3 Drawing Sheets

THERMOPLASTIC MELTING APPARATUS WITH A LEVEL INDICATOR

This application is a continuation-in-part of U.S. patent application Ser. No. 07/114,437, filed Oct. 29, 1987, now U.S. Pat. No. 4,821,922, and entitled "Thermoplastic Melting Apparatus With A Level Indicator".

FIELD OF THE INVENTION

This invention relates to thermoplastic melting apparatus, and, more particularly, to a thermoplastic melting apparatus having an exterior level indicator for measuring the quantity of thermoplastic material within the hopper or tank of the apparatus.

BACKGROUND OF THE INVENTION

Thermoplastic materials or so-called "hot melt" materials such as hot melt adhesives are stored in solid form and must be converted to the molten state before they can be supplied to applicators or dispensers. Commercially available thermoplastic melting apparatus generally include a hopper or tank having an open top for receiving solid thermoplastic material, heating elements mounted in the walls or at the bottom of the tank to convert the solid thermoplastic material to the molten state, a reservoir and/or manifold for receiving the molten material and a pump for pumping the molten material from the reservoir and/or manifold to one or more dispensers.

The tank which receives the solid thermoplastic material is normally enclosed within a housing having a cover plate for sealing its open top. The open top of the tank is closed by a lid to prevent contamination of the atmosphere and to avoid exposure of the thermoplastic material to air, which, particularly with hot melt adhesive, can cause oxidation and charring of the material. Both the cover plate and tank lid are removable in order to permit periodic loading of additional solid thermoplastic material into the tank.

Because the contents of the tank are hidden from view by the tank lid and housing cover plate, a level indicator must be provided in order to allow the operator to determine when the tank should be refilled with solid thermoplastic material. In the prior art, level indicators have been mounted within the interior of the tank and are directly exposed to the thermoplastic material therein. These level indicators have proven unreliable, particularly in measuring levels of viscous thermoplastic material such as hot melt adhesive.

One reason for inaccurate measurements by prior art level indicators is they lack the sensitivity to differentiate between the states of the thermoplastic material within the tank, i.e., solid or liquid. This can be a particular problem in melting apparatus having a grid melter or the like at the bottom of the tank wherein the thermoplastic material is in molten or liquid form in the area of the melter but in solid form above the melter. Another problem with prior art level indicators is that they may be sensitive to the temperature within the tank which can vary substantially depending upon the type of thermoplastic material heated therein. Additionally, prior art level indicators may provide an inaccurate reading for thermoplastic materials having different viscosities.

SUMMARY OF THE INVENTION

It is therefore among the objectives of this invention to provide a thermoplastic melting apparatus having a level indicator for measuring the quantity of thermoplastic material within the tank or hopper of a melting device which is unaffected by conditions within the interior of the tank or properties of the thermoplastic material located in the tank and which provides accurate measurements of the total quantity of thermoplastic material therein.

These objectives are accomplished in an apparatus for a thermoplastic melting apparatus in which one side of the bottom of the tank for receiving thermoplastic material is mounted on pivots and the opposite side is movable in proportion to the load, i.e., the quantity of thermoplastic material contained within the tank. Mechanical or electrical level indicator devices are mounted exteriorly of the tank to measure the amount of motion of the tank and produce a signal or indication corresponding to the quantity of material within the tank.

In one presently preferred embodiment, the side of the tank opposite the pivot is carried by a load cell positioned exteriorly of the tank. As the tank rotates with respect to the pivot, it applies a force to the load cell which is proportionate to the quantity or weight of thermoplastic material contained therein. In response to such force, the load cell produces a signal which provides a measurement of the quantity of material in the tank.

Alternatively, a mechanical level indicator is employed to sense the motion of the tank. In this embodiment, pivotal motion of the tank is effective to pivot interconnected rods or linkages located exteriorly of the tank over a distance proportionate to the quantity of material in the tank. A proximity sensor, one or more limit switches or similar means sense the extent of motion of the linkages and produce a signal which provides a measurement of the contents of the tank.

This invention is predicated upon the concept of providing an accurate measurement of the quantity of thermoplastic material within the tank of a thermoplastic melting device wherein the level indicator is isolated from the conditions in the interior of the tank. Accurate measurement of the level of thermoplastic material within the tank is ensured by minimizing the effect of external forces on the tank so that only the contents of the tank are measured.

External forces can be applied to the tank in at least two ways. First, in the presently preferred embodiment, the thermoplastic melting apparatus includes a tank which is connected to and supports a reservoir, manifold and one or more gear pumps. Molten material from the tank enters the reservoir and is pumped by the gear pump into the manifold and then to one or more dispensers. The gear pump has an output shaft which is driven by an endless belt or chain linkage connected to a motor and/or gear reducer. Because the pump is supported by the tank, while the motor is supported independently of this tank, motion of the drive linkage between the motor and pump would ordinarily apply a force to the tank acting along the run of the drive linkage. If this drive force is sensed by the mechanical or electrical level indicator devices, an inaccurate measurement of the contents of the tank would be produced.

In order to eliminate the effect on the level indicator devices of the force component produced by the drive linkage between the motor and pump, the pivots mounted on one side of the hopper are positioned in direct alignment, i.e., within the same plane, as the run of the drive linkage between the motor and pump. The dynamic force produced by motion of the drive linkage therefore acts directly through the pivots for the tank which transfer such force to the frame of the melting device so that it is not applied to the level indicator devices.

A second source of potentially inaccurate readings from the level indicator devices are external forces applied to the tank. In a presently preferred embodiment, the tank is completely contained within a housing having an open top which is enclosed by a cover. This housing cover is carried at one end by a hinge mounted directly to a frame element of the melting apparatus which is not connected to the tank, and the opposite end of the housing cover rests upon one or more rubber pads also connected to a frame element of the melting apparatus.

The tank lid is connected to the housing cover so that it can be lifted therewith for loading the tank with solid thermoplastic material, but this connection permits the tank lid to slide or float with respect to the housing cover to isolate it from forces applied to the housing cover. Such forces might, for example, be derived from tools or other objects placed atop the cover. In a presently preferred embodiment, the tank lid is mounted to the housing cover with slotted brackets. Movement of the housing cover relative to the tank lid is permitted along the slot formed in the bracket so that no forces are transmitted through the tank lid and tank to the level indicator devices.

DESCRIPTION OF THE DRAWINGS

The structure, operation and advantages of the presently preferred embodiment of this invention will become further apparent upon consideration of the following description taken in conjunction with the accompanying drawings, wherein.

DETAILED DESCRIPTION OF THE INVENTION

Figure 1:
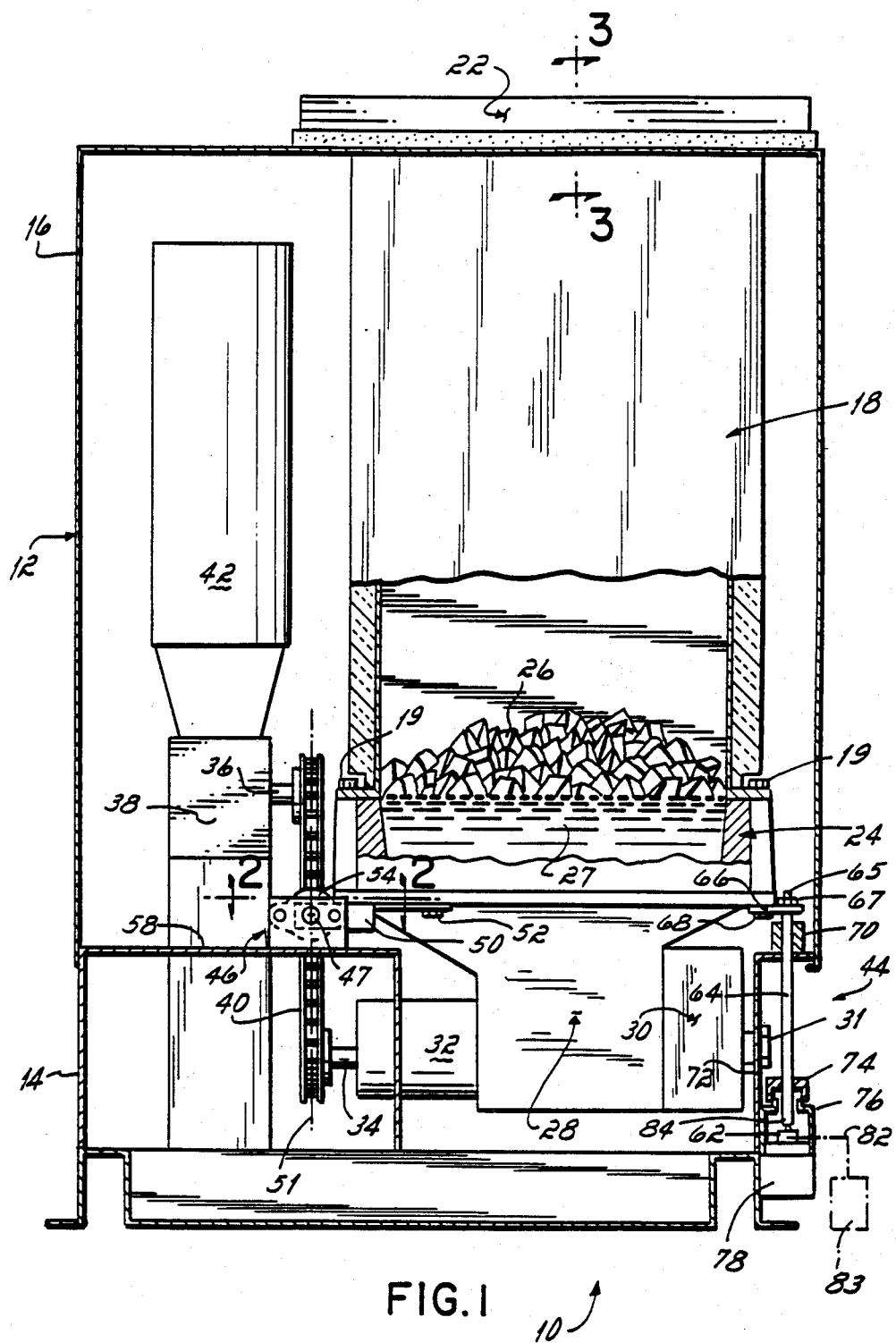
FIG. 1 is an elevational view in partial cross section of a thermoplastic melting device including one embodiment of a level indicator device of this invention.
Figure 3:
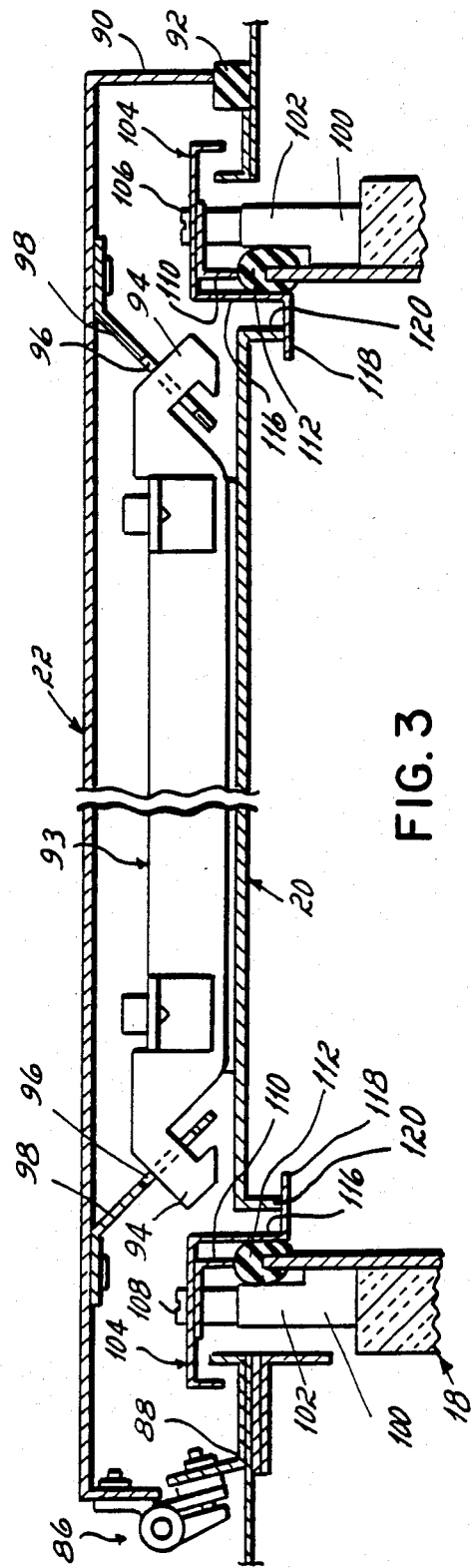
FIG. 3 is an enlarged view of the housing cover and floating tank lid of this invention taken along line 3—3 of FIG. 1.

Referring now to FIGS. 1 and 3, the thermoplastic melting apparatus 10 is of the type disclosed in U.S. Pat. No. 4,666,066 to Boccagno et al, which is incorporated by reference in its entirety herein. For purposes of describing this invention, apparatus 10 is illustrated schematically and generally comprises a housing 12 formed with a base 14 and a top portion 16. A hopper or tank 18 is mounted within the interior of the housing 12 and has an open top covered by a tank lid 20 connected to a housing cover 22 which are described in more detail below with reference to FIG. 3. The bottom of the tank 18 is connected by bolts 19 to a grid melter 24 which is effective to convert solid thermoplastic material 26 dumped into the tank 18 to the molten state 27. Mounted beneath the grid melter 24 is a reservoir 28 which receives the molten thermoplastic material therefrom and directs it into a manifold 30. The manifold 30 is connected by a fitting 31 to feed lines which lead to one or more applicators or dispensers (not shown).

The molten thermoplastic material is transferred from the reservoir 28 into the manifold 30 by a pair of gear pumps 32, 33 connected to the reservoir 28. The gear pumps 32, 33 have input shafts 34, 35, respectively, which are drivingly connected to the output shafts 36 of a pair of gear reducers 38 by drive linkages such as endless chains 40. In turn, each gear reducer 38 is driven by a motor 42. While only one of the drive units is shown, it should be appreciated that the output shaft 36 of each gear reducer 38 is drivingly connected to one of the pumps 32, 33 through a chain 40. The motion of each chain 40 applies a force to the gear pumps 32, 33 acting along the run of chains 40 as illustrated in FIGS. 1 and 2.

Figure 2:
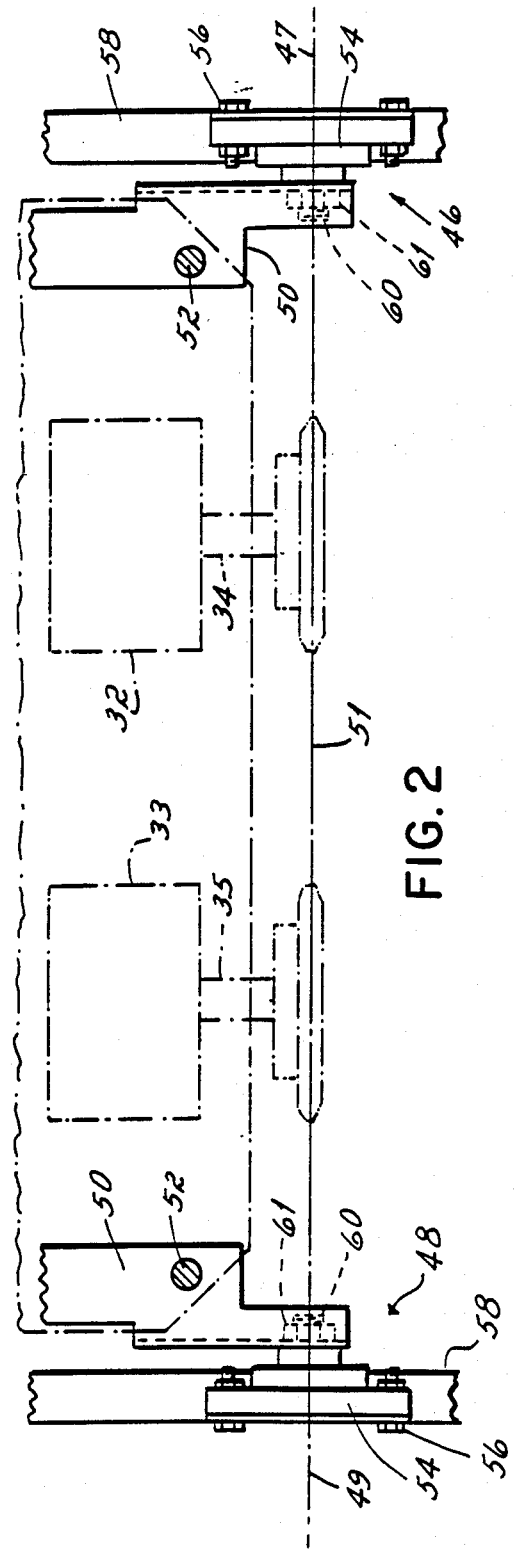
FIG. 2 is a view of the pump drive and tank pivots taken generally along line 2—2 of FIG. 1.

Referring now to FIGS. 1 and 2, one embodiment of a level indicator of this invention comprises structure for pivotally mounting the tank 18 with respect to the fixed housing 12, and structure for measuring the pivotal motion of the tank 18 as the quantity of thermoplastic material contained therein changes. The structure for pivotally mounting the tank 18 comprises a pair of pivots 46, 48 which are mounted to one side of the bottom of tank 18 at the front and back, respectively. Each pivot 46, 48 comprises a flange 50 secured to the underside of the tank 18 by at least one bolt 52. A bearing 54 is mounted by bolts 56 to a frame element 58 forming part of the base 14 of the housing 12. A pivot pin 60 extends from the bearing 54 and is fixedly mounted to the flange 50 by a nut 61. The tank 18 is therefore free to pivot with respect to the housing 12 with the pin 60 rotating within the fixed bearing 54.

An important aspect of this invention is that the pivots 46, 48 are mounted to the tank 18 such that the pivot axis 47 of pivot 46 is colinear with the pivot axis 49 of pivot 48 and both axes 47, 49 are disposed in a vertical plane indicated at 51 which extends through the run of each drive chain 40 between gear reducers 38 and gear pumps 32, 33. As a result, the force applied by the chains 40 to the gear pumps 32, 33 is isolated from the tank 18 and transferred directly to the fixed frame element 58 of the housing 12 via pivot pins 60 and bearings 54.

Isolation of the tank 18 from the forces applied by chains 40 is important in order to obtain an accurate reading of the quantity of thermoplastic material within the tank 18 by the measuring structure of level indicator 44. As illustrated on the righthand portion of FIG. 1, the measuring structure of the level indicator of this embodiment comprises a load cell 62 which is connected to a rod 64 having a threaded top portion 65. The top portion 65 of rod 64 is received within a flange 66 and adjustably secured thereto by a nut 67. The flange 66 is preferably mounted by a bolt 68 to the bottom of tank 18 on the side opposite pivots 46, 48. The shaft 64 extends downwardly from flange 66 through a guide 70 carried by a frame element 72 which forms part of the base 14 of housing 12.

The lower end of shaft 64 contacts the load cell 62. In order to protect the load cell 62 from dust or other contaminants which could affect its reading, the load cell 62 is mounted within an enclosure 76. A cover 74 is fixed on the rod 64 to enclose the top of the enclosure 76. The load cell 62 and enclosure 76 are, in turn, mounted upon a block 78 which is fixed to the frame element 72. A bushing (not shown) mounted in the block 78 supports a wire 82 from the load cell 62 which carries measurements from the load cell 62 to a monitor 83, shown schematically in FIG. 1.

As the tank 18 is loaded, for example, its righthand side as viewed in FIG. 1 rotates on pivots 46, 48 in a clockwise direction. In response, the shaft 64 is urged downwardly and its lower end 84 applies a force to the load cell 62. The load cell 62 is effective to measure the force applied by the shaft 64, which is proportional to the quantity and/or weight of material loaded into the tank 18, and generates a signal carried by wire 82 which provides a measurement of the contents of tank 18. The load cell 62 is calibrated so as to account for the weight of tank 18 and any other structure mounted thereto in order to ensure accurate measurement of the contents of tank 18.

Figure 4:
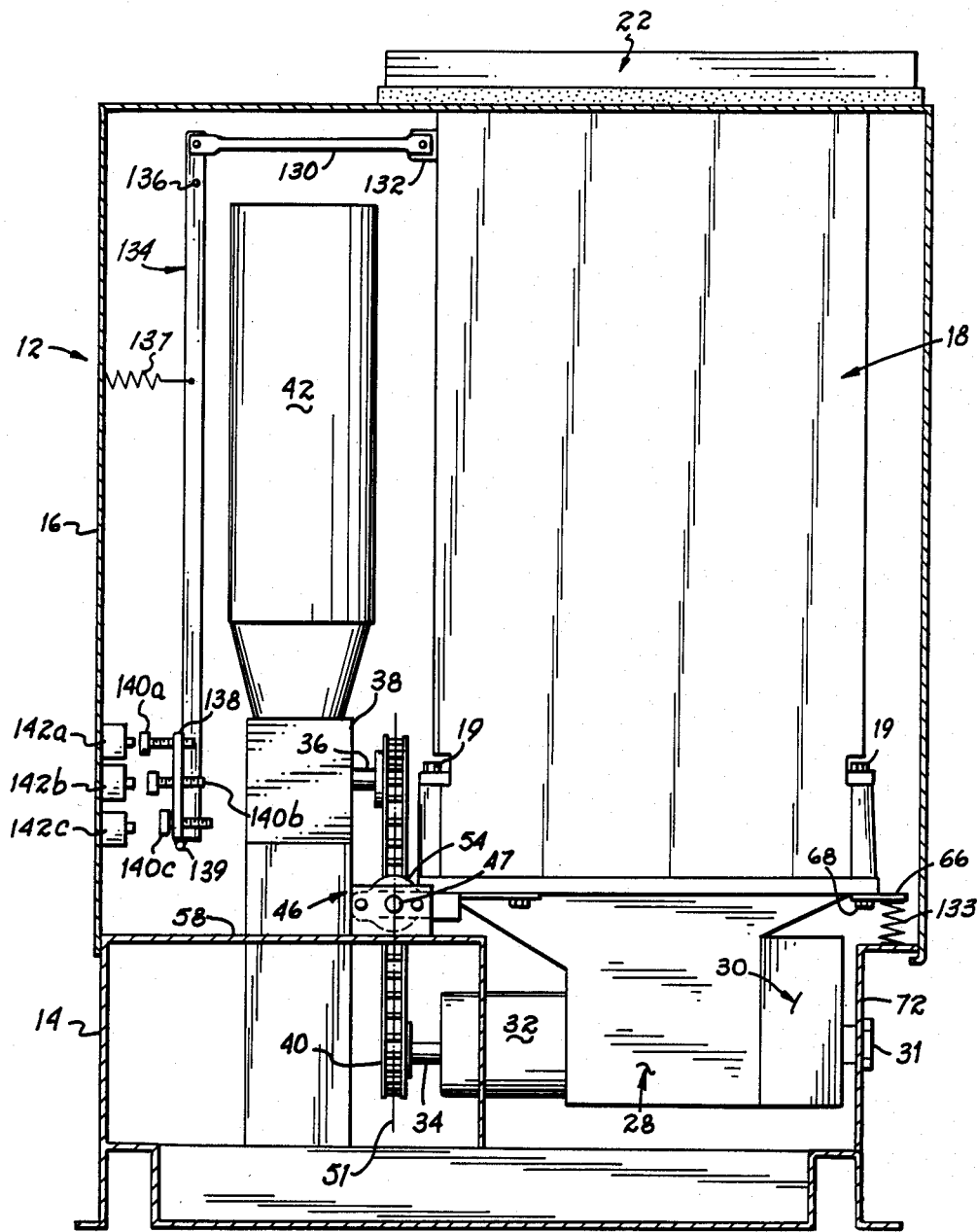
FIG. 4 is a view similar to FIG. 1 including an alternative embodiment of a level indicator device herein.

Referring now to FIG. 4, an alternative embodiment of the level indicator of this invention is illustrated. Whereas in FIG. 1 an electrical means of measuring the pivotal motion of tank 18 is employed, i.e., a load cell 62, in the embodiment of FIG. 4, such motion of tank 18 is sensed primarily by mechanical means. Except for the level indicator, the remaining structure illustrated in FIG. 4 is identical to that of FIG. 1 and is labelled with the same reference numbers.

A connecting rod 130 is mounted at one end to a tab 132 formed at the upper, lefthand side of the tank 18 as viewed in FIG. 4. That is, the connecting rod 130 is attached to the same side of tank 18 as the pivots 46, 48. The lower righthand side of the tank 18 is carried on a spring 133 which is mounted to the frame element 72. The opposite side of connecting rod 130 is pinned to the top end of a motion amplifying bar 134 which is carried on a pivot 136 mounted to the top portion 16 of housing 12. A spring 137 is connected between the housing 12 and motion amplifying bar 134 to take up any play or slop in the connections between the tank 18, connecting rod 130 and motion amplifying bar 134.

The opposite, lower end of amplifying bar 134 mounts a block 138 on a hinge 139 which carries a series of trip screws 140a, b, c. These trip screws 140a, b, c are vertically spaced along the block 138 and align with corresponding limit switches 142a, b, c, respectively, which are attached in vertical alignment to the top portion 16 of housing 12. As shown in FIG. 4, the trip screws 140a, b, c are laterally adjustable in block 138 relative to limit switches 142a, b, c, and, in the presently preferred embodiment, the trip screws 140a, b, c are staggered so that the trip screw 140a is closest to its corresponding limit switch 142a and the tip screw 140c is furthest from its corresponding limit switch 142c.

The mechanical level indicator of FIG. 4 operates as follows. As the tank 18 is loaded with material, its righthand side rotates about the pivots 46, 48 in a clockwise direction. This motion pulls the connecting rod 130 to the right as viewed in FIG. 4, thus pivoting the motion amplifying bar 134 in a clockwise direction about pivot 136. The lower end of motion amplifying bar 134 carrying trip screws 140a, b, c thus moves toward the limit switches 142a, b, c. Because the pivot 136 is located near the top end of the motion amplifying bar 134 just beneath its connection to the connector rod 130, a relatively small lateral movement of the connector rod 130 produces a relatively large swinging or arcuate motion of the lower end of motion amplifying bar 134 to facilitate measurement of the contents of tank 18 as described below.

The trip screw 140a extends outwardly the furthest from block 138 so that it contacts limit switch 142a first as the motion amplifying bar 134 pivots. The limit switch 142a produces a signal which indicates that the tank 18 has a relatively low quantity of material therein. As the tank 18 continues to be filled and amplifying bar 134 pivots further to the left, the trip screws 140b, c successively engage the limit switches 142b, c, respectively. The limit switch 142b produces a signal which represents an intermediate material level within tank 18, and trip switch 142c produces a signal which represents a full material level within tank 18.

The block 138 pivots in a clockwise direction about hinge 136 so that the laterally staggered trip bars 140a, b, c can contact their respective limit switches 142a, b, c. This contact is maintained until such time as the tank 18 is unloaded, e.g., through usage of the material therein, and the amplifying bar 134 pivots in the opposite, counterclockwise direction. The limit switches 142a, b, c each produce a signal upon disengagement with their trip screws 140a, b, c to alert the operator when refiling of the tank 18 is needed.

The mechanically actuated level indicator illustrated in FIG. 4 may be modified in some respects and yet perform essentially the same function as described above. For example, the limit switches 142a, b, c could be replaced with a proximity sensor or similar mechanism which would sense the motion of amplifying bar 134 without actual contact therewith. Additionally, more or less limit switches 142 and corresponding trip screws 140 could be employed to measure the quantity of material within the tank 18, e.g., only two limit switches could be employed to detect a low, alarm level and a high, filled level.

Referring now to FIG. 3, the tank lid 20 and housing cover 22 are illustrated in more detail. Another important aspect of this invention is to isolate the tank lid 20 from the housing cover 22 so that any forces applied to the housing cover 22, e.g., by objects placed thereon etc., are not transmitted to the tank lid 20 and hence measured by the load cell 62 or the limit switches 142a, b, c.

The housing cover 22 is mounted at one end to the top portion 16 of housing 12 by a hinge 86 carried by a flange 88. The opposite side of housing cover 22 has a downturned edge 90 which rests against rubber bumpers 92, only one of which is shown in FIG. 3. A slat 93 is mounted to the front and back of the tank lid 20, only one of which is shown in FIG. 3. Each slat 93 is formed with a transversely extending arm 94 at opposite ends. Each ar 94 is received within the elongated slot 96 of a bracket 98 mounted to the underside of the housing cover 22.

With the tank lid 20 and housing cover 22 closed as shown in FIG. 3, the arms 94 of slat 93 are positioned approximately at the midpoint of the elongated slot 96 of connector 98. When the housing cover 22 is pivoted upwardly about hinge 86 to permit access to the interior of tank 18, the tank lid arms 94 engage the lower side of the elongated slot 96 in each bracket 98 so that the tank lid 20 is pivoted upwardly with the housing cover 22. If any downward force is applied to the housing cover 22, such as by placing an object thereon, the housing cover 22 pivots about hinge 86 and its edge 90 moves downwardly against the rubber bumpers 92. Although the housing cover 22 compresses the rubber bumpers 92 in response to such force, the tank lid arms 94 are slidable within the elongated slot 96 of the brackets 98 and does not contact housing cover 22. This isolates such force from the tank 18 and load cell 62.

The structure for mounting the tank lid 20 to the tank 18 includes an support 100 connected to the outer wall of the tank 18 formed with an upwardly extending leg 102 which clears the upper end of the tank 18. A flange 110 is mounted to the top of leg 102 of support 100 by screws 106, 108 and extends downwardly atop a rubber seal 112 mounted to the top edge of the tank 18.

A splash guard 104 having a vertical leg 116 and a horizontal leg 118 is also mounted to the support 100 by pins 106, 108. The vertical leg 116 of splash guard 104 rests against the inside of rubber seal 112 to further seal the interior of the tank 18. The horizontal leg 118 of splash guard 104 supports a lip 120 depending from the tank lid 20 so that the arm 94 of tank lid 20 is centered within the bracket slot 96 as described above.

While the invention has been described with reference to a preferred embodiment, it will be understood by those skilled in the art that various changes may be made and equivalents may be substituted for elements thereof without departing from the scope of the invention. In addition, many modifications could be made to adapt a particular situation or material to the teachings of the invention without departing from the essential scope thereof. For example, a thermoplastic melting apparatus 10 shown in the Figs. is merely one type of melting apparatus which could be utilized with the level indicator 44 of this invention. Whereas melting apparatus 10 includes a grid melter 24 and both a reservoir 28 and manifold 30, it is contemplated that other types of melting apparatus could be employed such as those in which the walls of the hopper or tank heat the thermoplastic material or the heating means is provided within the reservoir and pumped directly therefrom to applicators or dispensers. Each of these types of melting apparatus could be adapted for use with the level indicator 44 herein and include the pivots 46, 48 aligned with the pump drive linkages.

Therefore, it is intended that the invention not be limited to the particular embodiment disclosed as the best mode contemplated for carrying out this invention, but that the invention will include all embodiments falling within the scope of the appended claims.

What is claimed is:

1. Apparatus for converting solid thermoplastic material to molten thermoplastic material, comprising:
   a tank for receiving solid thermoplastic material;
   melting means connected to said tank for melting the solid thermoplastic material to form molten thermoplastic material;
   pump means mounted upon said tank for pumping molten thermoplastic material out of said tank;
   drive means mounted independently of said tank;
   linkage means drivingly connected between said pump means and said drive means, said linkage means transmitting a drive force from said drive means for operating said pump means;
   pivot means connected to one side of said tank for permitting pivotal motion of said tank;
   level indicator means for sensing the extent of said pivotal motion of said tank and providing a corresponding measurement of the quantity of thermoplastic material carried within said tank; and
   said pivot means being positioned relative to said linkage means so as to isolate said level indicator means from forces operating said pump means.

2. The apparatus of claim 1 in which said drive means comprises a motor drivingly connected to a gear reducer having an output shaft, said pump means comprises at least one pump having an input shaft and an output communicating with the molten thermoplastic material produced by said melting means, said linkage of said drive means comprising a drive chain extending between said output shaft of said motor and said input shaft of said pump.

3. The apparatus of claim 2 in which said apparatus includes a frame, said pivot means comprising a pair of bearings fixedly mounted to said frame on one side of the bottom of said tank, each of said bearings pivotally mounting a pin connected to said tank for permitting pivotal motion of said tank with respect to said frame.

4. The apparatus of claim 1 in which said level indicator means comprises at least one linkage member movable in response to pivotal motion of said tank, and sensor means for sensing the extent of motion of said linkage member and providing a corresponding measurement of the quantity of thermoplastic material carried within said tank.

5. Apparatus for converting solid thermoplastic material to molten thermoplastic material, comprising:
   a tank for receiving solid thermoplastic material;
   melting means connected to said tank for melting the solid thermoplastic material to form molten thermoplastic material;
   pump means mounted upon said tank for pumping molten thermoplastic material out of said tank;
   drive means mounted independently of said tank;
   means drivingly connected between said pump means and said drive means for transmitting a drive force from said drive means to operate said pump means;
   pivot means connected to one side of said tank for permitting pivotal motion of said tank;
   linkage means connected to said tank and being movable in response to said pivotal motion of said tank;
   sensing means for sensing the extent of said motion of said linkage means in response to pivotal motion of said tank, said sensing means being effective to provide a measurement corresponding to the quantity of thermoplastic material carried within said tank; and
   said pivot means being positioned relative to said linkage means so as to isolate said linkage means from forces operating said pump means.

6. The apparatus of claim 5 in which said linkage means comprises:
   a connector rod mounted at one end to said tank, said connector rod being movable in response to said pivotal motion of said tank;
   a motion amplifying bar having a first end and a second end, said motion amplifying bar being carried on a pivot located near said first end thereof;
   the opposite end of said connector rod being mounted to said first end of said motion amplifying bar so that said motion of said connector rod causes said second end of said motion amplifying bar to swing along an arc which is relatively large in comparison to the extent of said motion of said connector rod.

7. The apparatus of claim 6 in which said sensing means comprises:

at least one first limit switch and one second limit switch;

at least one first trip member and one second trip member;

said first and second trip members being carried on said second end of said motion amplifying bar, and said first and second limit switches being fixedly mounted in alignment therewith so that said swinging movement of said second end of said motion amplifying bar causes said first trip member to contact said first limit switch and said second trip member to contact said second limit switch.

8. The apparatus of claim 7 in which the spacing between said first trip member and said first limit switch is less than the spacing between said second trip member and said second limit switch so that said first and second limit switches are activated sequentially upon movement of said motion amplifying bar to provide corresponding measurements as thermoplastic material is placed into or removed from said tank.

9. Apparatus for converting solid thermoplastic material to molten thermoplastic material, comprising:

a housing having an interior formed with an open top, said housing having a top cover for opening and closing said interior;

a tank mounted within said interior of said housing, said tank being formed with an interior adapted to receive thermoplastic material, said tank having a lid for opening and closing said interior;

connector means for mounting said lid of said tank to said cover of said housing so that said lid is protected from forces applied to said cover in a direction toward said interior of said tank;

melting means connected to said tank for melting the solid thermoplastic material therein to form molten thermoplastic material;

pump means communicating with said melting means for pumping molten thermoplastic material;

drive means having linkage drivingly connected to said pump means, said linkage producing a drive force for operating said pump means acting between said drive means and said pump means;

pivot means connected to one side of said tank for permitting pivotal motion of said tank, said pivot means having a pivot axis located in a plane containing said drive force produced by said linkage;

level indicator means connected to said tank for sensing the extent of said pivotal motion of said tank and providing a corresponding measurement of the quantity of thermoplastic material carried within said tank.

10. The apparatus of claim 9 in which said tank further includes sealing means, comprising:

a rubber seal mounted to the top edge of said tank;

a support mounted to said tank;

a flange carried by said support, said flange being formed with a leg for contacting said rubber seal.

11. The apparatus of claim 10 in which said sealing means comprises a splash plate mounted to said support and extending into said interior of said tank, said splash plate abutting said rubber seal for sealing said interior of said tank.

12. The apparatus of claim 9 in which said top cover of said housing is hinged at one end for movement between an open position and a closed position, the opposite end of said top cover being engagable with a resilient pad mounted to said housing when said top cover is in said closed position.

13. The apparatus of claim 9 in which said connector means comprises:

a slat having an arm at each end, said slat being mounted to said lid of said tank;

a pair of brackets mounted to the bottom of said housing cover at each side, each of said brackets being formed with an elongated slot which receives one of said arms of said tank lid;

said housing cover being movable toward said tank lid in response to the application of forces to said housing cover, said arms of said slat of said tank lid being slidable within said elongated slot in said brackets so as to avoid contact between said tank lid and said housing cover.

* * * * *